(12) United States Patent
Kobayashi

(10) Patent No.: US 6,583,376 B2
(45) Date of Patent: Jun. 24, 2003

(54) SEALING APPARATUS USED IN A WIRE CUT ELECTRIC DISCHARGE MACHINE

(75) Inventor: Haruo Kobayashi, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 79 days.

(21) Appl. No.: 09/781,985

(22) Filed: Feb. 14, 2001

(65) Prior Publication Data

US 2001/0025831 A1 Oct. 4, 2001

(30) Foreign Application Priority Data

Mar. 30, 2000 (JP) ........................................ 2000-094803

(51) Int. Cl.[7] ................................ B23H 7/10; B23H 7/02
(52) U.S. Cl. ................................ 219/69.12; 219/69.14; 277/382; 277/392
(58) Field of Search ................................ 219/69.12, 69.14; 277/390, 391, 392, 382

(56) References Cited

U.S. PATENT DOCUMENTS

| 4,565,915 A | * | 1/1986 | Girardin | 219/69.12 |
| 4,647,747 A | | 3/1987 | Goto | 219/69.12 |
| 4,918,279 A | * | 4/1990 | Babel et al. | 219/69.12 |
| 5,028,757 A | * | 7/1991 | Aramaki et al. | 219/69.12 |
| 5,071,318 A | * | 12/1991 | Bice et al. | |
| 5,111,016 A | * | 5/1992 | Lodetti et al. | 219/69.12 |
| 5,171,955 A | * | 12/1992 | Hosaka et al. | 219/69.12 |
| 5,755,446 A | * | 5/1998 | Dean et al. | |

FOREIGN PATENT DOCUMENTS

| EP | 621100 A1 | * | 11/1994 |
| JP | 4-201017 A | * | 7/1992 |
| JP | 6-134621 A | * | 5/1994 |

* cited by examiner

Primary Examiner—Geoffrey S. Evans
(74) Attorney, Agent, or Firm—Oliff & Berridge, PLC

(57) ABSTRACT

A wire cut electric discharge machine that includes a machining tank storing a machining fluid, an upper arm disposed at an upper portion of the machining tank, a lower arm inserted into the machining tank, a wire electrode extending between the upper arm and the lower arm for performing electric discharge machining on a workpiece placed fixedly in the machining tank, a support member mounted to the machining tank for supporting the lower arm such that the lower arm is slidable relative to the machining tank and sealed from the machining tank, and an O-ring interposed between the lower arm and the support member. The support member has a groove formed all around its inner circumference, and the O-ring makes contact with sidewalls of the groove. Accordingly, even when the outside diameter of the O-ring varies depending on an error in diameter of the lower arm, contact between the sidewalls and the O-ring remains unchanged and fluid-tightness can be reliably ensured.

19 Claims, 7 Drawing Sheets

SEALING APPARATUS USED IN A WIRE CUT ELECTRIC DISCHARGE MACHINE

BACKGROUND OF THE INVENTION

1. Field of Invention

The invention relates to a wire cut electric discharge machine that performs electric discharge machining on a workpiece placed fixedly in a machining tank and, more particularly, to a wire cut electric discharge machine that performs electric discharge machining using a wire electrode stretched between an upper arm disposed at an upper portion of a machining tank and a lower arm slidably inserted into the machining tank.

2. Description of Related Art

In a wire cut electric discharge machine as described, a seal structure using an O-ring has been conventionally employed to allow the lower arm, inserted into the machining tank, to be sealed against leakage from the machining tank and to be slidable relative to the machining tank.

FIG. 6 is a sectional view showing a conventional seal structure for use in a wire cut electric discharge machine. An XY table 36 moves a workpiece W together with a machining tank 33, on an X-Y plane. Thus, while a lower arm 42, made of stainless steel or other materials, is inserted into the machining tank 33 so as to be movable, in the X and the Y directions, relative to the machining tank 33, the lower arm 42 must be sealed against leakage from the machining tank 33.

In this seal structure 51, a housing 53, as a support member, is attached to the machining tank 33 so as to be movable, relative to the machining tank, in a direction perpendicular to the sheet surface of FIG. 6 (hereinafter referred to as the "X-direction") and sealed against leakage from the machining tank 33. The lower arm 42 is mounted to the housing 53 with intervention by an O-ring 55 and a seal packing 57. In this case, the lower arm 42 is movable, relative to the machining tank 33, in a left-right direction (referred to as the "Y-direction" hereinafter) in FIG. 6 because of sliding contact between the lower arm 42 and the seal packing 57. At the same time, the lower arm 42 is sealed, with the O-ring 55 and the seal packing 57, from the machining tank 33. The housing 53 has a groove 59, which is rectangular in cross section and formed all along its inner circumference. The O-ring 55 is fitted into the groove 59 so as to be prevented from being released from the housing 53 when the lower arm 42 slides relative to the machining tank 33.

In the conventional housing 53, as shown in FIG. 7A, the O-ring 55 and the seal packing 57 are sandwiched between a bottom surface 59a of the groove 59 and the outer circumference of the lower arm 42 to ensure that the lower arm 42 is sealed against leakage from the machining tank 33. The distance between sidewalls 59b of the groove 59 is intentionally made greater than the thickness of the O-ring 55. Accordingly, when the outside diameter of the lower arm 42 is small, a clearance is provided between the groove 59 and the O-ring 55, as shown in FIG. 7B, and the machining fluid 35 leaks from the clearance.

On the other hand, when the outside diameter of the lower arm 42 is large, the O-ring 55, sandwiched between the bottom surface 59a and the seal packing 57, is greatly compressed, as shown in FIG. 7C. In this case, a great resilient force is generated from the O-ring 55 to the outer circumference of the lower arm 42, resulting in inferior sliding of the lower arm 42.

Accordingly, in the conventional wire cut electric discharge machine, the lower arm 42 must be manufactured, by undergoing surface finish cutting, within extremely fine tolerances so as to be, for example, 85 mm in diameter with a tolerance of ±0.1 mm.

SUMMARY OF THE INVENTION

In view of the foregoing problems, the invention provides a wire cut electric discharge machine that ensures smooth sliding of a lower arm relative to a machining tank and fluid-tightness between the lower arm and the machining tank, even when the diameter of the lower arm has a rough tolerance.

According to one aspect of the invention, a wire cut electric discharge machine includes a machining tank storing a machining fluid, an upper arm disposed at an upper portion of the machining tank, a lower arm inserted into the machining tank, a wire electrode extending between the upper arm and the lower arm for performing electric discharge machining on a workpiece placed fixedly in the machining tank, a support member mounted to the machining tank for supporting the lower arm such that the lower arm is slidable relative to the machining tank and sealed from the machining tank, and an O-ring interposed between the lower arm and the support member. The support member has a groove formed all along its inner circumference, and the O-ring makes contact with a pair of sidewalls of the groove so that the lower arm is kept sealed from the machining tank.

In this structure, even when the outside diameter of the O-ring varies depending on an error in diameter of the lower arm, contact between the sidewalls and the O-ring does not change greatly and fluid-tightness can be ensured. In addition, because the O-ring does not need to be sandwiched between a bottom surface of the groove and the outer circumference of the lower arm, the groove may be designed to be relatively deep so that smooth sliding of the lower arm can be ensured even when the outside diameter of the lower arm is large.

Accordingly, even when the diameter of the lower arm has a rough tolerance, smooth sliding of the lower arm and fluid-tightness between the lower arm and the machining tank can be reliably ensured. Thus, commercially available pipes can be used, without undergoing finish cutting, as the lower arm. As a result, the manufacturing cost of the wire cut electric discharge machine can be significantly reduced.

According to another aspect of the invention, a clearance is provided between the O-ring and the bottom surface of the groove.

Thus, even when the outside diameter of the lower arm is larger than the design value, smooth sliding of the lower arm can be reliably ensured. Accordingly, smooth sliding of the lower arm can be ensured more reliably in spite of variations in the outside diameter of the lower arm.

According to another aspect of the invention, a seal packing is provided between the O-ring and the outer circumference of the lower arm. Thus, smoother sliding of the lower arm can be ensured.

According to another aspect of the invention, the seal packing is L-shaped, and one side of the seal packing makes contact with the outer circumference of the lower arm and another side thereof makes contact with one of the sidewalls of the groove.

Because one side of the seal packing is sandwiched between the O-ring and the outer circumference of the lower arm, smoother sliding of the lower arm can be ensured. In addition, because another side of the seal packing is in contact with one of the sidewalls, the O-ring is unlikely to be released from the groove. In other words, because another side of the seal packing overlaps with one of the sidewalls of the groove, the O-ring hardly gets released from the overlapping side. Thus, smooth sliding as well as fluid-tightness of the lower arm is reliably ensured.

According to another aspect of the invention, a plurality of O-rings are arranged side by side along an axial direction of the lower arm and fitted in the groove.

In this case, O-rings having a smaller cross-sectional diameter can be used as compared with the case where a single O-ring is fitted into the groove. As a result, the support member can be downsized outside-diametrically. In addition, the lower arm can be supported reliably by a plurality of O-rings, arranged side by side along the axial direction of the lower arm, even when a force exerted perpendicularly to the axial direction of the lower arm, that is, a twisting force is applied to the lower arm. Thus, the wire cut electric discharge machine can be reduced in size, and a twisting force against the lower arm can be effectively cancelled.

According to another aspect of the invention, a seal packing is provided between at least one O-ring and the outer circumference of the lower arm. In addition, the groove is formed into two steps and a step adjacent to the seal packing is wider than a step adjacent to at least one O-ring.

In this case, smoother sliding of the lower arm can be ensured by the seal packing. Additionally, a seal packing having a width equal to or greater than the width of the O-ring or the sum of the widths of a plurality of O-rings can be used. A wide seal packing can more reliably prevent at least one O-ring from getting released from the groove. Consequently, smooth sliding as well as fluid-tightness of the lower arm is reliably ensured.

According to still another aspect of the invention, the groove has a width slightly smaller than the sum of cross-sectional diameters of the at least one O-ring. Thus, the at least one O-ring is compressed and fitted between a pair of sidewalls of the groove to prevent leakage of the machining fluid. Even when the outside diameter of the at least one O-ring varies depending on an error in diameter of the lower arm, contact between the sidewalls and the at least one O-ring does not change greatly and, as a result, fluid-tightness is ensured.

According to still another aspect of the invention, the groove has a depth substantially equal to a cross-sectional diameter of the O-ring. Thus, an error in diameter of the lower arm is within the cross-sectional diameter of the O-ring, and the lower arm can be movably supported relative to the machining tank and sealed from the machining tank.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF PREFERRED EMBODIMENTS

Figure 1:
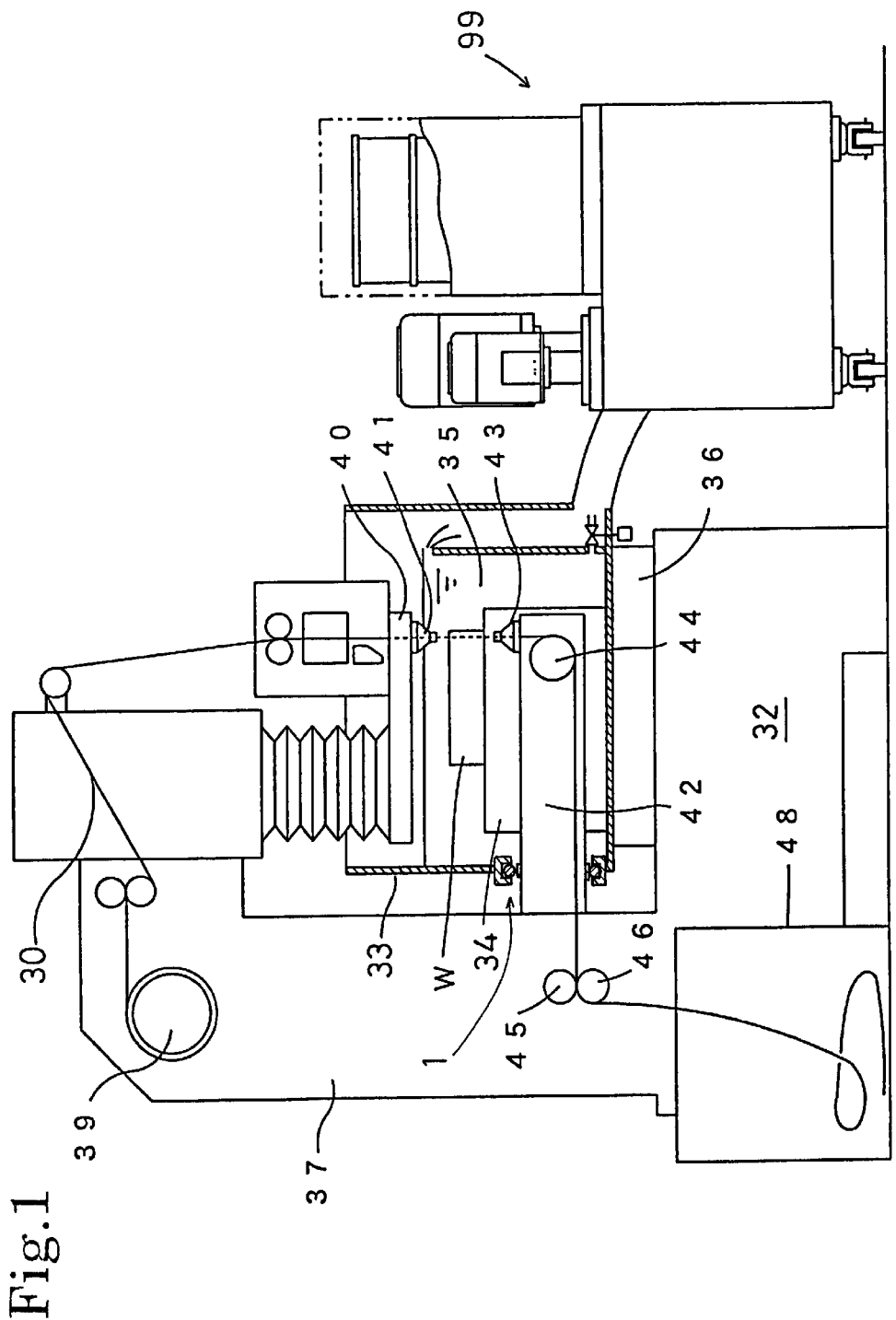
FIG. 1 is a front view showing a general structure of a wire cut electric discharge machine according to a first embodiment of the invention.

Preferred embodiments of the invention will be described with reference to the accompanying drawings. FIG. 1 is a front view showing the general structure of the wire cut electric discharge machine according to a first embodiment of the invention. In the wire cut electric discharge machine, a wire electrode 30 is supported between a pair of rollers and fed toward a workpiece W as the rollers rotate.

As shown in FIG. 1, a machining tank 33 is placed on a base 32 of the wire cut electric discharge machine. The workpiece W is fixedly placed on a worktable 34, which is fixed to the machining tank 33, and is immersed in an electrically insulative machining fluid (fresh water or a mixture of fresh water and oil) 35. The machining fluid 35 is supplied from a machining fluid supply device 99. The machining fluid 35, contaminated due to the electric discharge machining of the workpiece W, is returned to the machining fluid supply device 99, filtered, and recycled. An XY table 36, which is movable on an X-Y plane, is disposed between the base 32 and the machining tank 33, and is driven by a driving mechanism (not shown).

A wire bobbin 39, around which the wire electrode 30 is wound, is provided at an upper portion of a column extending vertically from the base 32. An upper nozzle 41 is attached to an upper arm 40, which is supported at an upper portion of the column 37, while an lower nozzle 43 is disposed at a lower arm 42, which is supported at a lower portion of the column 37.

The wire electrode 30, unreeled from the wire bobbin 39 and fed by the above-mentioned rollers, is stretched in a generally vertical direction from the upper nozzle 41 to the lower nozzle 43. The workpiece W is interposed therebetween. In this state, a pulse current is applied from a power source (not shown) to the wire electrode 30 and the workpiece W. This enables electric discharge machining to be performed at a minute gap (electric discharge machining portion) between the workpiece W and the wire electrode 30 passing in a vertical downward direction.

The machining fluid 35 is ejected from either or both of the upper nozzle 41 and the lower nozzle 43 to remove metal chips produced during electric discharge machining and cool the electric discharge machining portion. The wire electrode 30 is fine, typically being 0.05 mm to 0.3 mm in diameter. Although the feed speed (travel speed) of the wire electrode 30 varies depending on the electric discharge machining condition, the thickness of the workpiece W, and other factors, it is 100 to 300 mm/second when the thickness of the workpiece W is approximately 50 mm.

The lower arm 42 is formed from stainless steel or other materials into a pipe. Within the pipe, a direction-changing pulley 44 is disposed blow the lower nozzle 43. The direction-changing pulley 44 changes the feed direction of the used wire electrode 30 from a vertical direction to a horizontal direction (toward the column 37). After being fed to the column 37, the used wire electrode 30 is conveyed to a storage cabinet 48 by a pair of vertically arranged rollers 45, 46 and stored therein. For this purpose, at least one of the rollers 45, 46 is driven to convey the used wire electrode 30.

Figure 2:
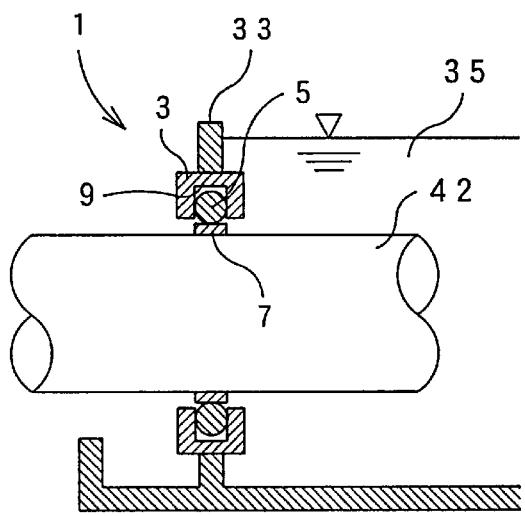
FIGS. 2A–2C are sectional views each showing a seal structure, for use in the wire cut electric discharge machine, according to the first embodiment of the invention.
Figure 2:
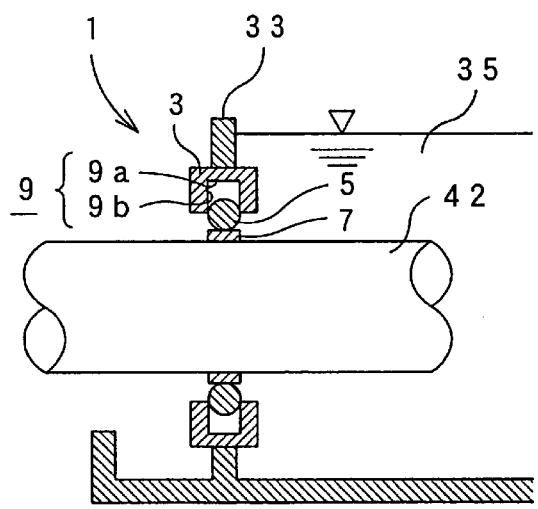
Figure 2:
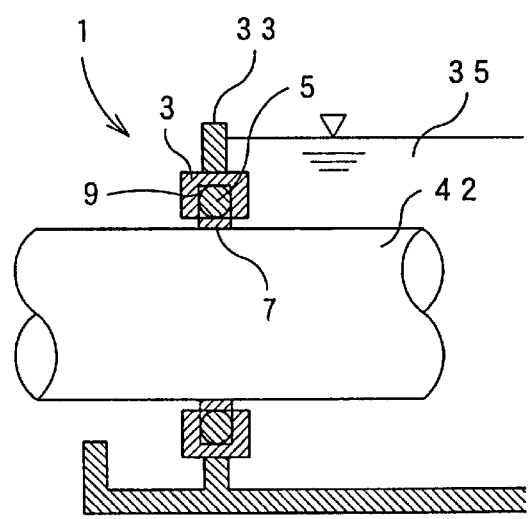

FIGS. 2A–2C are sectional views each showing the seal structure 1 of the wire cut electric discharge machine according to a first embodiment of the invention. As shown in FIG. 2A, a housing 3, as a support member, is mounted to a machining tank 33 so as to be movable, relative to the machining tank 33, in a direction perpendicular to the sheet surface (in the X-direction) and sealed from the machining tank 33. The structure that makes the housing 3 slidable relative to the machining tank 33 and sealed from the machining tank 33 is disclosed in U.S. Pat. No. 4,647,747, which is incorporated herein by reference.

The lower arm 42 is mounted through the housing 3 and sealed using an O-ring 5 and a seal packing 7. Sliding contact occurs between the lower arm 42 and the seal packing 7 allowing the lower arm 42 to be slidable, relative to the machining tank 33, in a left-right direction in FIG. 2A (in the Y-direction). At the same time, the lower arm 42 is sealed, with the O-ring and the seal packing, from the machining tank 33.

The seal packing 7 is provided, on its inner circumference, with a ethylene fluoride resin to reduce sliding resistance, and provided, on its outer circumference, with a rubber material to augment the elasticity thereof.

The housing 3 has a groove 9, which is rectangular in cross section and formed all around the housing's inner circumference. The O-ring 5 is fitted into the groove 9 so as to be prevented from being released from the housing 3 when the lower arm 42 slides relative to the machining tank 33. The distance between a pair of sidewalls 9b (FIG. 2A) of the groove 9 is slightly smaller than the thickness (cross-sectional diameter) of the O-ring 5. The depth of the groove 9 is nearly equal to the cross-sectional diameter of the O-ring 5.

In the seal structure 1 as described above, the O-ring 5 makes contact with the sidewalls 9b of the groove 9 to provide the above-described fluid-tightness. Accordingly, even when the outside diameter of the O-ring 5 varies due to an error in the diameter of the lower arm 42, contact between the sidewalls 9b and the O-ring 5 does not change greatly and fluid-tightness can be ensured. For example, as shown in FIG. 2B, even when the outside diameter of the lower arm 42 is smaller than the design value, side surfaces (on the right and left sides in FIG. 2B) of the O-ring 5 elastically make contact with the pair of sidewalls 9b. Thus, fluid-tightness is maintained.

In addition, in the seal structure 1, the O-ring 5 does not need to be sandwiched between a bottom surface 9a of the groove 9 and the outer circumference of the lower arm 42. Thus, as described above, the depth of the groove 9 can be made nearly equal to the cross-sectional diameter of the O-ring 5. Accordingly, even when the outside diameter of the lower arm 42 is larger than the design value, as shown in FIG. 2C, the O-ring 5 makes minimal contact with the bottom surface 9a of the groove 9 and does not hinder the lower arm 42 from sliding.

Consequently, in the seal structure 1 according to the first embodiment, smooth sliding of the lower arm 42 and fluid-tightness between the lower arm 42 and the machining tank 33 can be reliably ensured even when the diameter of the lower arm 42 has a rough tolerance. For example, although the conventional seal structure requires that the diameter of the lower arm 42 be 85 mm with a tolerance of ±0.1 mm, the diameter may be 85 mm with a tolerance of ±0.5 mm in this seal structure. Thus, commercially available pipes can be used, without undergoing a finishing process, as the lower arm 42. As a result, the manufacturing cost of the wire cut electric discharge machine can be significantly reduced.

Figure 3:
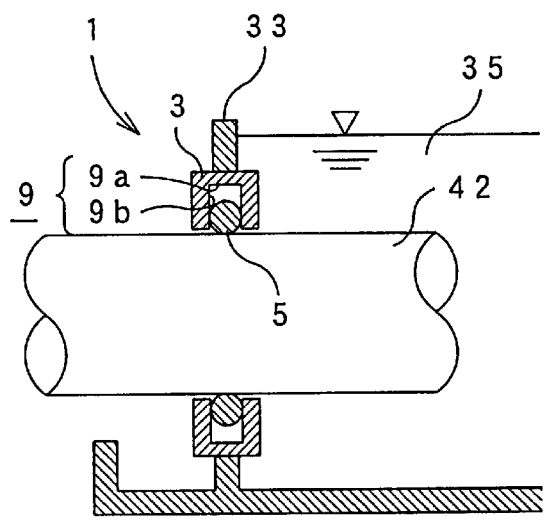
FIGS. 3A–3C are sectional views each showing a seal structure according to a modification of the first embodiment of the invention.
Figure 3:
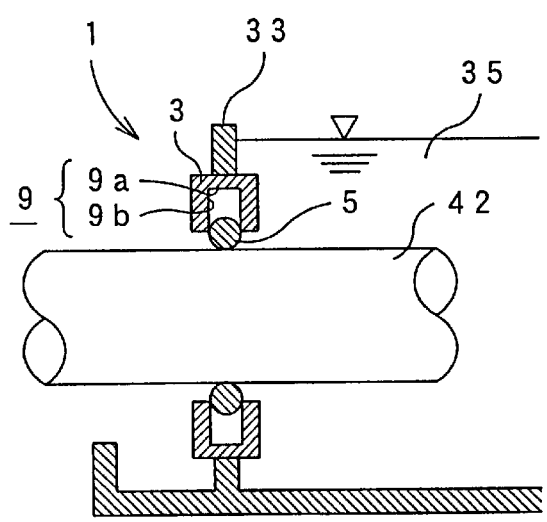
Figure 3:
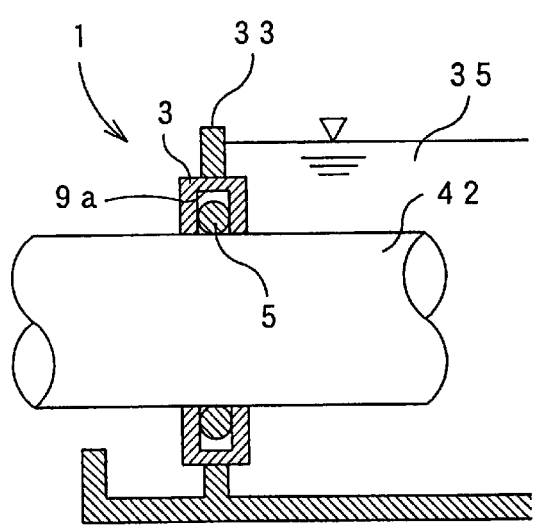

Referring now to FIGS. 3A–3C, a modification of the first embodiment of the invention will be described. In this modification, the seal packing 7 is not provided. Without the seal packing 7, the lower arm 42 becomes less slidable, but the seal structure without a seal packing is as advantageous as the seal structure with a seal packing. In this case, the groove 9 may be made deeper, as shown in FIG. 3A, so that a clearance is intentionally produced between the outer circumference of the O-ring 5 and the bottom surface 9a of the groove 9. In this case also, even when the outside diameter of the lower arm 42 is smaller than the design value, as shown in FIG. 3B, the O-ring 5 makes contact with the sidewalls 9b and ensures the fluid-tightness. Also, when the outside diameter of the lower arm 42 is larger than the design value, as shown in FIG. 3C, the O-ring 5 does not make contact with the bottom surface 9a of the groove 9 and smooth sliding of the lower arm 42 is reliably ensured. Accordingly, smooth sliding of the lower arm 42 is ensured more reliably in spite of variations in the outside diameter of the lower arm 42.

However, a deeper groove 9 will slightly increase the size of the housing 3. Needless to say, if the seal packing 7 is provided for the first embodiment, smoother sliding of the lower arm 42 can be ensured.

Figure 4:
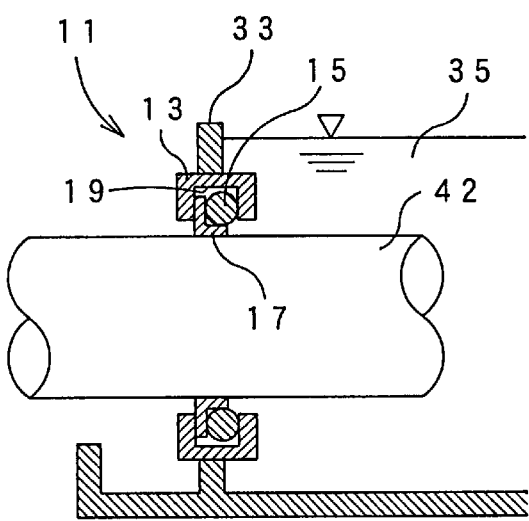
FIGS. 4A–4C are sectional views each showing a seal structure according to a second embodiment of the invention.
Figure 4:
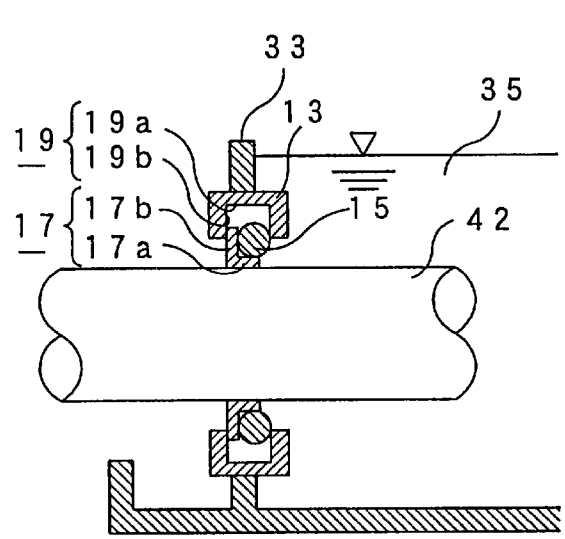
Figure 4:
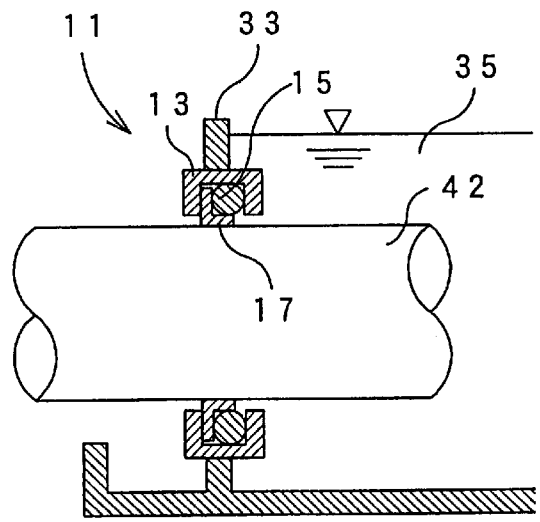

FIGS. 4A–4C are sectional views each showing a seal structure 11 according to a second embodiment of the invention. In this seal structure 11, a housing 13 having a rectangular groove 19 is mounted to the machining tank 33 so as to allow the lower arm 42 to be slidable, relative to the machining tank 33, in the X-direction and sealed from the machining tank 33. The lower arm 42 is mounted through the housing 13 and sealed by an O-ring 15 and a seal packing 17.

The seal packing 17 is structured to be L-shaped in cross section. One side 17a of the seal packing 17 makes contact with the outer circumference of the lower arm 42 and another side 17b thereof makes contact with one of a pair of sidewalls 19b of the groove 19. The O-ring 15 is sandwiched between the one side 17b of the seal packing 17 and the other one of the sidewalls 19b. Accordingly, in any case where the outside diameter of the lower arm 42 is equal to, smaller than, or larger than the design value, as shown in FIGS. 4A, 4B, and 4C, respectively, the lower arm 42 can be kept sealed reliably from the machining tank 33.

The seal structure 11 has several advantages in the structural features of the seal packing 17. Namely, one side 17a of the seal packing 17, which is provided with the ethylene fluoride resin on its inner surface, is sandwiched between the O-ring 15 and the outer circumference of the lower arm 42. This allows the lower arm 42 to slide more smoothly. In addition, because the other side 17b of the seal packing 17 overlaps with the sidewall 19 of the groove 19, the O-ring 15 substantially continuously maintains contact with the other side 17b. Thus, in the seal structure 11, the O-ring 15 is unlikely to be released from the groove 19, and smooth sliding and fluid-tightness of the lower arm 42 is more stably ensured.

Figure 5:
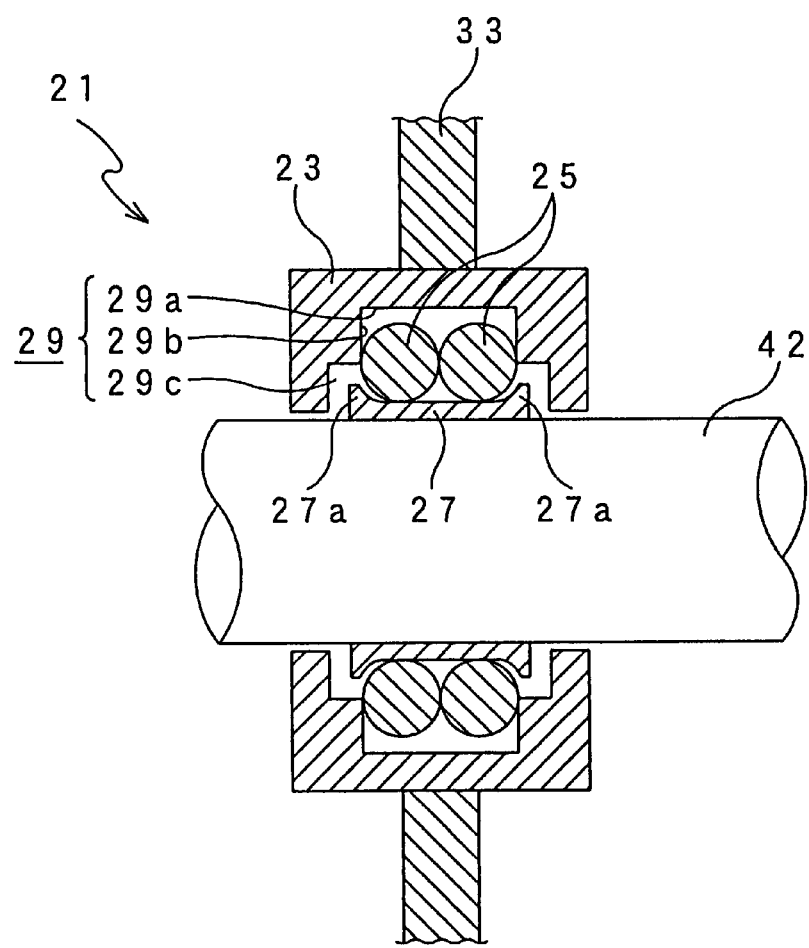
FIG. 5 is a sectional view showing a seal structure according to a third embodiment of the invention.
Figure 6:
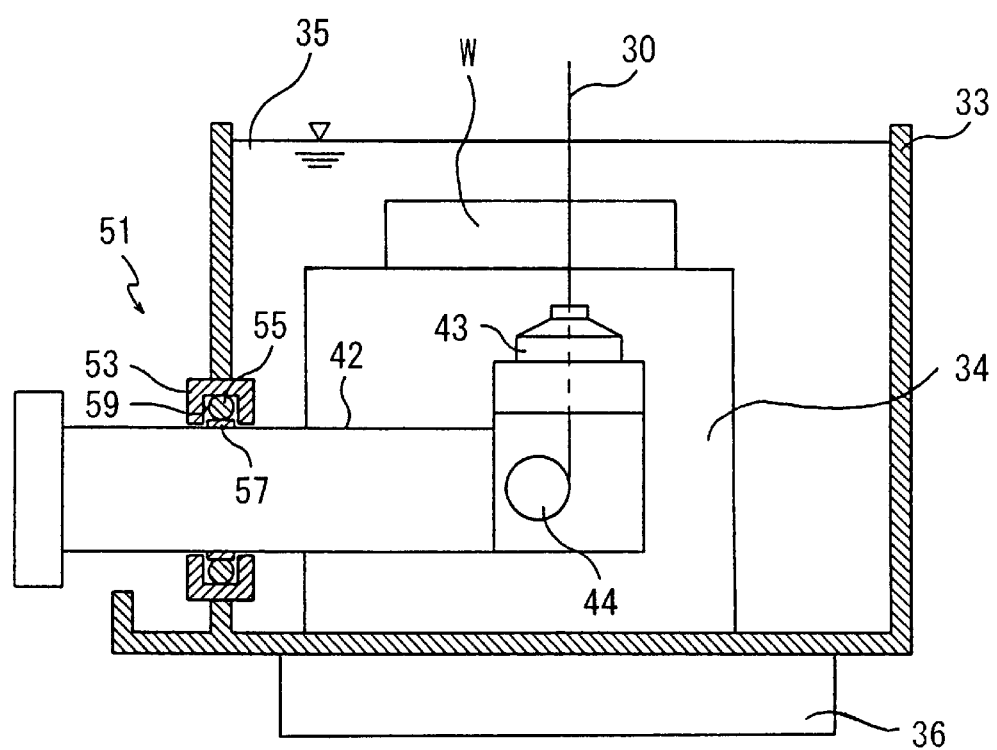
FIG. 6 is a sectional view showing a general structure of a conventional seal structure for use in a wire cut electric discharge machine.
Figure 7:
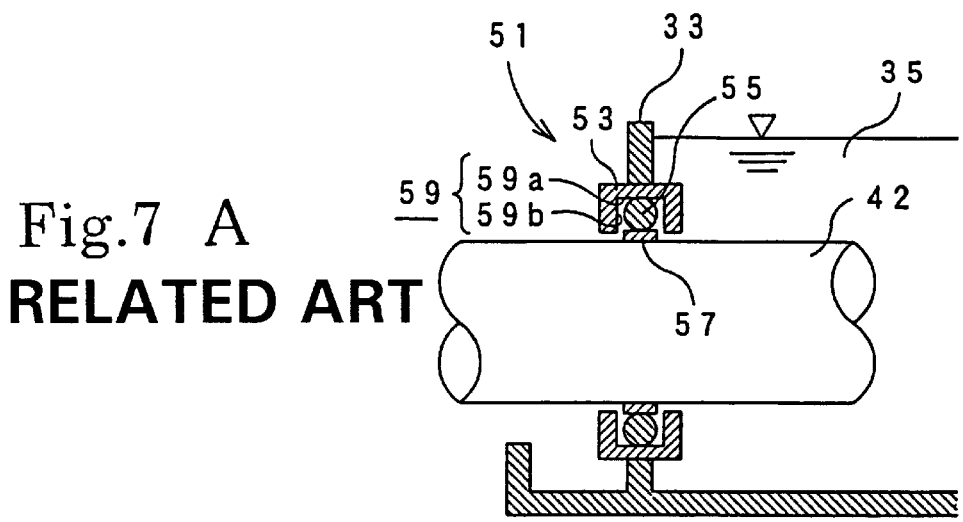
FIGS. 7A–7C illustrate problems associated with the conventional seal structure.
Figure 7:
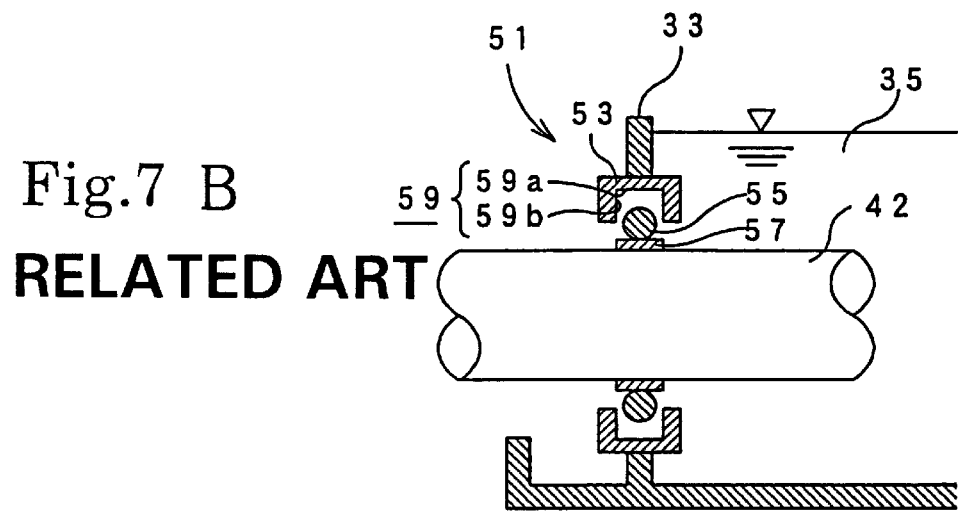
Figure 7:
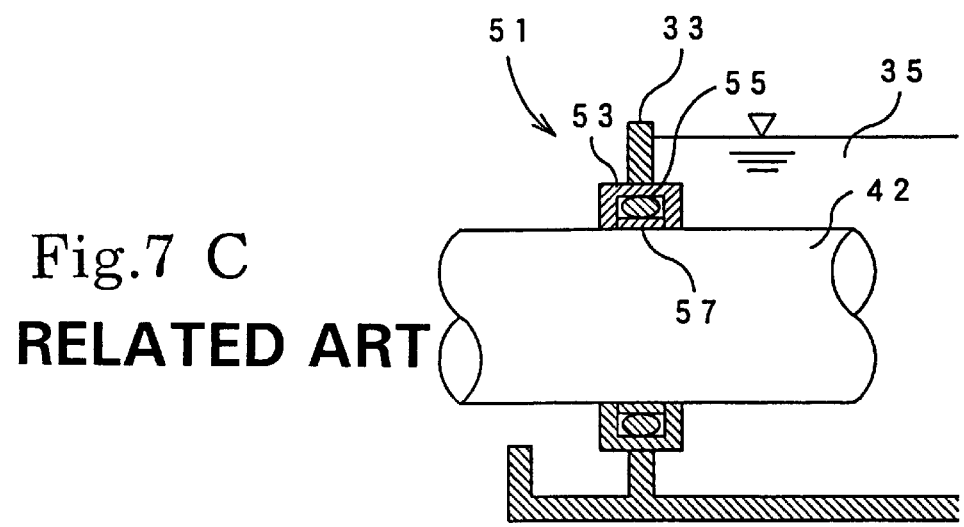

FIG. 5 is a sectional view showing a seal structure 21 according to a third embodiment of the invention. In this seal structure 21, a housing 23 is mounted to the machining tank 33 so as to allow the lower arm 42 to be slidable, relative to the machining tank 33, in the X-direction and sealed from the machining tank 33. The housing 23 has a two-step groove 29. More specifically, sidewalls 29b extend from a bottom surface 29a of the groove 29 so as to provide therebetween a space for accommodating, in a sandwiched manner, two O-rings 25. In the space, the two O-rings 25 are arranged side by side in the sliding direction of the lower arm 42. Additionally, the groove 29 has a wide portion 29c, which is wider than the above-described space and faces the lower arm 42.

The lower arm 42 is inserted into the two O-rings 25 with intervention of a seal packing 27. The seal packing 27 has a flat portion that makes contact with the two O-rings 25 and flanges 27a that gradually project outside-diametrically on both ends of the flat portion. The seal packing 27 is disposed within the wide portion 29c.

In the seal structure 21, a plurality of O-rings 25 are fitted into a single groove 29, side by side, in the sliding direction of the lower arm 42. Thus, O-rings 25 having a smaller cross-sectional diameter (thickness) can be used as compared with when a single O-ring is fitted into a groove of the same width. As a result, the housing 23 can be downsized outside-diametrically. The wire cut electric discharge machine can be downsized, as well. In addition, because the lower arm 42 is supported by a plurality of the O-rings 25 provided along the axial direction of the lower arm 42, a twisting force against the lower arm 42 is effectively cancelled.

In the seal structure 21, the groove 29 is formed, as described above, into two steps and the wide portion 29c is provided adjacent to the seal packing 27. Thus, the seal packing 27, wider than the sum of the diameters of the two O-rings 25, can be used. This makes the lower arm 42 slide more smoothly and reliably prevents the O-rings 25 from being released from the groove 29. In addition, the seal structure 21 has the flanges 27a, which do not contact the O-rings 25, at both ends of the seal packing 27. The flanges 27a more reliably prevent the O-rings 25 from being released from the groove 29. Thus, smooth sliding and fluid-tightness of the lower arm 42 is more stably ensured.

While the invention has been described in connection with specific embodiments thereof, it should be understood that the invention is not limited to the above-described embodiments. Various modifications can be made without departing from the scope of the invention.

For example, three or more O-rings can be provided along the axial direction of the lower arm 42. The shape in cross section of the seal packing and the housing may be modified accordingly.

What is claimed is:

1. A wire cut electric discharge machine, comprising:
    a machining tank storing a machining fluid;
    an upper arm disposed at an upper portion of the machining tank;
    a lower arm inserted into the machining tank;
    a wire electrode extending between the upper arm and the lower arm for performing electric discharge machining on a workpiece placed fixedly in the machining tank;
    a support member mounted to the machining tank for supporting the lower arm such that the lower arm is slidable relative to the machining tank and sealed from the machining tank, the support member having a groove formed all around its inner circumference; and
    at least one O-ring interposed between the lower arm and the support member, the width of the groove is less than a sum of a cross-sectional diameter of the at least one O-ring, so the at least one O-ring makes contact with a pair of sidewalls of the groove so that the lower arm is kept sealed from the machining tank.

2. The wire cut electric discharge machine according to claim 1, wherein a clearance is provided between the at least one O-ring and a bottom surface of the groove.

3. The wire cut electric discharge machine according to claim 1, further comprising a seal packing disposed between the at least one O-ring and an outer circumference of the lower arm.

4. The wire cut electric discharge machine according to claim 3, wherein the groove is formed into two steps and a step adjacent to the seal packing is wider than a step adjacent to the at least one O-ring.

5. The wire cut electric discharge machine according to claim 4, wherein the at least one O-ring includes a plurality of O-rings, which are arranged side by side along an axial direction of the lower arm and fitted into the groove.

6. The wire cut electric discharge machine according to claim 1, wherein the at least one O-ring includes a plurality of O-rings, which are arranged side by side along an axial direction of the lower arm and fitted into the groove.

7. The wire cut electric discharge machine according to claim 1, wherein the groove has a depth substantially equal to a cross-sectional diameter of the at least one O-ring.

8. A wire cut electric discharge machine, comprising:
    a machining tank storing a machining fluid;
    an upper arm disposed at an upper portion of the machining tank;
    a lower arm inserted into the machining tank;
    a wire electrode extending between the upper arm and the lower arm for performing electric discharge machining on a workpiece placed fixedly in the machining tank;
    a support member mounted to the machining tank for supporting the lower arm such that the lower arm is slidable relative to the machining tank and sealed from the machining tank, the support member having a groove formed all around its inner circumference;
    at least one O-ring interposed between the lower arm and the support member, and
    a seal packing, wherein the seal packing is substantially L-shaped in cross section, and one side of the seal packing makes contact with an outer circumference of the lower arm, and is disposed between the at least one O-ring and the outer circumference of the lower arm, and another side thereof makes contact with one of the pair of sidewalls of the groove, the width of the groove is less than a sum of a cross-sectional diameter of the at least one O-ring and a width of the another side of the seal packing, so the at least one O-ring makes contact with the other of the pair of sidewalls of the groove and the lower arm is kept sealed from the machining tank.

9. A sealing mechanism for an arm of a wire cut electric discharge machine, comprising:
    a flexible sealing plate having an opening through which the arm passes;
    a U-shaped housing, in cross-section, mounted around the opening, an open end of the U-shaped housing facing into the opening; and
    an O-ring mounted on the arm and received in the U-shaped housing, wherein a distance between sides of the U-shaped housing is less than a width of the O-ring such that the O-ring contacts the sides of the U-shaped housing.

10. The sealing mechanism according to claim 9, wherein a depth of the U-shaped housing is greater than the width of the O-ring.

11. The sealing mechanism according to claim 9, further comprising a seal packing mounted to the arm between the O-ring and the arm.

12. The sealing mechanism according to claim 11, wherein the seal packing has an ethylene fluoride resin coating on a side contacting the arm and an elastic surface engaging the O-ring.

13. The sealing mechanism according to claim 11, wherein the seal packing is L-shaped in cross-section, a base of the seal packing is mounted on the arm, and a leg of the seal packing is interposed between the O-ring and a side of the U-shaped housing.

14. The sealing mechanism according to claim 13, wherein the seal packing has an ethylene fluoride resin coating on a side of the base contacting the arm and an elastic surface engaging the O-ring.

15. The sealing mechanism according to claim 9, further comprising at least one additional O-ring mounted on the arm adjacent the O-ring to provide at least two O-rings.

16. The sealing mechanism according to claims 15, wherein inner surfaces of the sides of the U-shaped housing have at least a two step structure, a first step adjacent a base of the U-shaped housing, the first step having a separation distance between the sides less than a sum of widths of the at least two O-rings.

17. The sealing mechanism according to claim 16, further comprising a seal packing mounted to the arm between the at least two O-rings and the arm, the seal packing having a width greater than the sum.

18. The sealing mechanism according to claim 17, wherein an outer step adjacent the open end has a separation distance greater than the width of the seal packing.

19. The sealing mechanism according to claim 18, wherein the seal packing has an ethylene fluoride coating on a side contacting the arm and a flange at each edge on a side engaging the at least two O-rings.

* * * * *